(No Model.)
W. LANGMUIR.
CUSHION TIRE.
No. 490,714. Patented Jan. 31, 1893.
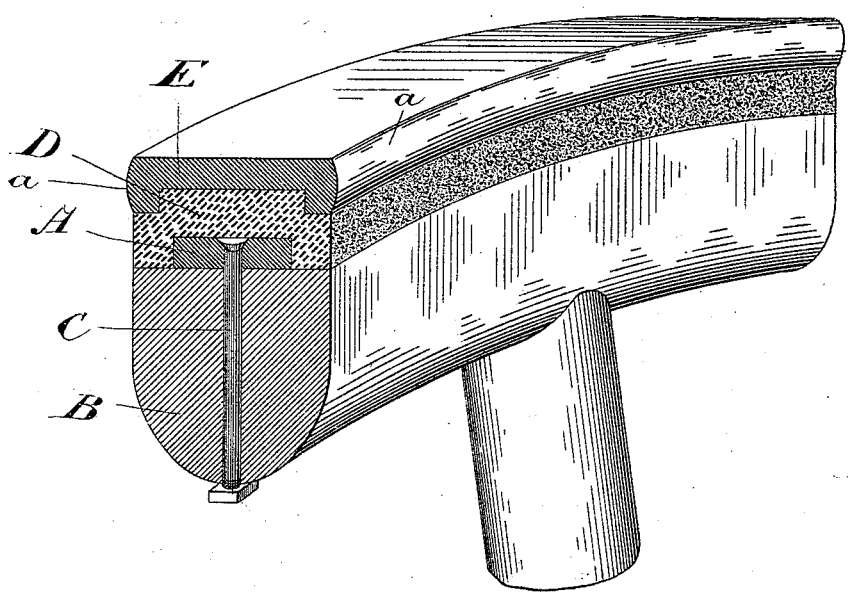
Witnesses
J. R. Cameron
John E. Cameron
Inventor
Woodburn Langmuir
by Donald C. Ridout & Co.
Attys.

UNITED STATES PATENT OFFICE.

WOODBURN LANGMUIR, OF TORONTO, CANADA.

CUSHION-TIRE.

SPECIFICATION forming part of Letters Patent No. 490,714, dated January 31, 1893.

Application filed April 25, 1892. Serial No. 430,614. (No model.)

*To all whom it may concern:*

Be it known that I, WOODBURN LANGMUIR, of the city of Toronto, in the county of York, in the Province of Ontario, Canada, have invented certain new and useful Improvements in Cushion-Tires, of which the following is a specification.

The object of the invention is to provide a cushion tire which is so perfectly held to the felly that the joint cannot be affected by dampness, and it consists, essentially, of a metal band bolted or riveted to the felly, a rubber band overlapping the metal band and an outer steel band shrunk onto the rubber band so as to compress its outer edge tightly against the felly; substantially as hereinafter more particularly explained.

The drawing represents a perspective sectional view, showing a portion of a felly provided with my improved cushion tire.

In the drawing, A, represents a metal band preferably made of iron and secured tightly to the felly B, by the bolts or rivets C. It will be observed that the metal band A, is narrower than the felly B, and that the heads of the bolts C, are counter-sunk so as to leave the outer surface of the band A, perfectly smooth.

D, is a rubber band made the exact width of the felly B, and having a recess in its center to receive the band A. The portion of the band D, which overlaps on each side of the band A, fits against the felly B, and the recess in the band D, is preferably made slightly deeper than the thickness of the band A, so that it will touch the felly before it comes in contact with the surface of the band A.

E, is an outer band preferably made of steel substantially the same width as the felly and having flanges $a$, to fit into grooves made in the top edge of each side of the rubber band D. This outer band is shrunk onto the band D, and compresses the outer edges of the said band tightly against the felly, the force of the shrinking being sufficient to form hermetically sealed joints between the felly B, and the band D, and the flanges $a$, and band D. In this way all the parts forming the tire are not only rigidly held together, but the joints being hermetically sealed as it were, no moisture can find its way into the joints and in this way the tire is much more durable. Moreover, the band A being entirely inclosed by non-conducting substances it is not likely to expand by heat, as it is protected from the direct rays of the sun, and therefore the joints of the fellies always remain tight.

What I claim as my invention is:—

1. As an improved tire, a metal band bolted, or otherwise secured to the felly, a rubber band overlapping the metal band and an outer metal band shrunk onto the rubber band so as to compress its outer edges tightly against the felly, substantially as and for the purpose specified.

2. As an improved tire, a metal band narrower than and rigidly secured to the felly, a rubber band substantially the same width as the felly and having an inner recess to fit over the metal band and an outer metal band shrunk upon the rubber band, substantially as and for the purpose specified.

3. As an improved tire, a metal band narrower than and rigidly secured to the felly, a rubber band substantially the same width as the felly and having an inner recess to fit over the metal band, the outer edges of the rubber band being grooved to receive the flanges formed upon the outer metal band which is shrunk upon the rubber band, substantially as and for the purpose specified.

4. As an improved tire, a metal band bolted or otherwise secured to the felly, a rubber band over-lapping the metal band and touching the felly so as to inclose the same and an outer metal band surrounding the rubber band.

WOODBURN LANGMUIR.

In presence of—
 CAMPBELL RIDOUT,
 DONALD C. RIDOUT.